United States Patent Office 3,010,021
Patented Nov. 21, 1961

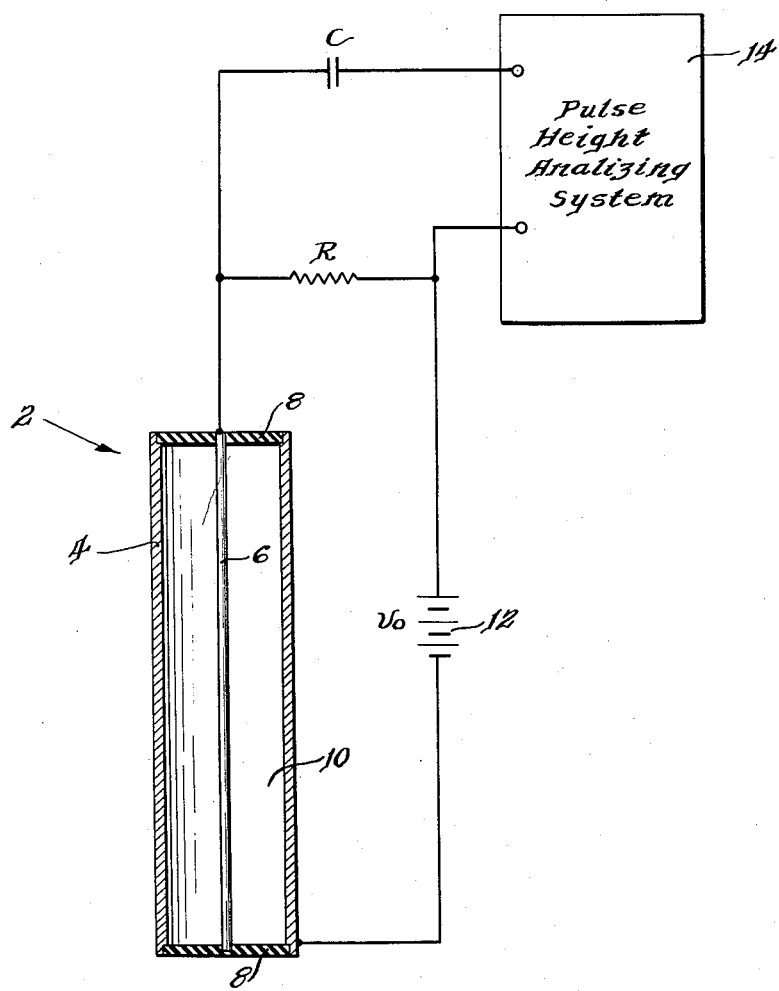

3,010,021
METHOD FOR MEASURING RADIATION
William C. Roesch and Richard C. McCall, Richland, Wash., assignors to the United States of America as represented by the United States Atomic Energy Commission
Filed Feb. 24, 1959, Ser. No. 795,302
2 Claims. (Cl. 250—83.6)

This invention relates to the measurement of an unknown integrated quantity of radiation, and more particularly, to such measurement with a condenser ionization chamber.

It is necessary from a health standpoint to monitor the integrated quantity of radiation or dosage to which personnel engaged in nuclear activity are exposed. One of the more common means for such monitoring is accomplished by the use of condenser, or electrostatic, ionization chambers, the familiar pocket dosimeters or pencils being eaxmples of such instruments.

As is well known in the art, one conventional method for measuring an integrated quantity of radiation consists of charging a condenser ionization chamber to a predetermined initial voltage $V_0$, then exposing the chamber to the radiation, and then measuring the final voltage $V_f$ across the terminals of the chamber by means of an electrometer. Since the integrated quantity of radiation to which the chamber has been exposed is proportional to $(V_0 - V_f)$, and since the initial voltage $V_0$ is fixed, the final voltage $V_f$ may be taken as a measure of the radiation, and the actual quantity of integrated radiation may be obtained through the use of suitably calibrated curves or scales. The chamber is then prepared for use again by recharging it to the predetermined initial voltage. An example of this prior art method is described in U.S. Patent No. 1,855,669, Method and Apparatus for the Measurement of Radiation Intensity, issued April 26, 1932, in the names of O. Glasser et al.

This prior art method has several disadvantages, especially as applied to situations where it is desired to take readings from a large number of ionization chambers and record and process these readings automatically, and especially in situations where the individual readings are likely to be small. When the integrated quantity of radiation is small, the final voltage will be close to the initial voltage, with the result that a small error in measuring the final voltage will introduce a large percentage error in the quantity of radiation ascertained. In effect, the method involves attempting to measure a small difference between two large numbers, when applied to small dosage measurements.

According to the principles of the present invention, the magnitude of the current pulse required to recharge the chamber to its initial predetermined voltage is employed as the measure of dosage. Instead of measuring the final voltage, as in the prior art, the chamber is recharged to its initial value through a suitable impedance, and the magnitude of the pulse of recharging current [proportional to $V_0 - V_f$] is amplified and measured directly by a suitable pulse height analyzing system.

The method of the present invention is more accurate and sensitive, especially as applied to small doses, not only because the voltage difference is measured directly, but also because the measured quantity, being a current pulse instead of a fairly large constant direct voltage, is more susceptible to prior amplification and accurate measurement. Furthermore, the method of the present invention does not require separate measurement and recharging steps, since the reading is taken simultaneously with the recharging operation. Also, the present method is readily adapted to high speed processing of large numbers of dosimeters; analogue or digital techniques are readily applied to the output pulses so that recording and analysis can be achieved by high speed automatic data processing equipment.

Accordingly, one object of the present invention is to provide a method for accurately measuring a quantity of radiation with a condenser ionization chamber, particularly small quantities of radiation.

A further object of the present invention is to provide a method as described above which lends itself readily to the techniques of automation.

Another object of the present invention is to provide a method as described above which dispenses with the necessity for separate measuring and recharging steps.

Other objects of the present invention will be made manifest upon perusal of the following description and the attached schematic and wiring diagram.

As shown in the drawing, a conventional condenser ionization chamber 2 may consist simply of a hollow metallic cylinder 4, a metallic wire 6 mounted within the cylinder coaxially therewith, and insulating disks 8 joined to the end portions of the cylinder around the end portions of the wire to seal an air medium 10 between the cylinder and the wire. It will be understood that the entire ionization chamber, as above described, is physically separable from the remainder of the circuit shown in the drawing, but that it may be placed in a stationary jig so as to automatically be connected to the remainder of the circuit in the manner shown.

When positioned in the circuit, the ionization chamber constitutes an electrical condenser in a series circuit which also includes a signal impedance or resistor R and a stable source 12 of direct voltage $V_0$. After the chamber has initially become fully charged to the voltage $V_0$, it is removed from the circuit and exposed, as by being worn or carried by a worker, to the integrated quantity of radiation which it is desired to measure.

As is well known, the incident radiation cumulatively discharges the ionization chamber so that at the end of the exposure period, the extent to which the chamber has been discharged is a measure of the integrated quantity of radiation to which it has been exposed. After chamber 2 has been exposed to radiation, it is replaced in the circuit of the drawing. Source 12 immediately causes a pulse of recharging current to flow through resistor R in recharging chamber 2 to its initial voltage $V_0$. The recharging current causes a corresponding voltage pulse to occur across resistor R. The magnitude of the pulse peak is proportional to the amount of discharge of the chamber during its exposure to radiation and is thus proportional to the integrated quantity of radiation. The voltage pulse across resistor R is coupled, by way of condenser C, to any suitable pulse height analyzing system 14 which indicates and/or records the dosage. Although pulse height analyzing systems of various known kinds can be used, a pulse height analyzer consisting of a very high impedance cathode follower input circuit, a stable slow-pulse amplifier, and a peak reading voltmeter was found to be very satisfactory.

It is now apparent that the method presented provides for the accurate measurement and/or recording of an unknown quantity of radiation with a condenser, or electrostatic, ionization chamber. It is not necessary to accurately read an initial and final voltage which may be very close to one another in magnitude, to subtract their values, and to employ calibration curves to ascertain an unknown quantity of radiation.

The method described herein readily lends itself to the techniques of automation. For example, a large number of dosimeters may be numbered and passed in numerical sequence through a holder which would place each dosimeter in time sequence in the circuit of the drawing. Computer cards would be perforated by conventional apparatus driven by amplified voltage pulses from the dosimeters that are generated across resistor R, the position of the perforation on the card corresponding to the magnitude of the voltage pulse. The order of the computer cards would correspond to the order of the dosimeters, so that consistent correlation between dosimeters and cards is maintained. Each time the dosimeter is "read," a new row on the card would be used. The cards could be run through totalizers at any time to sum the perforations in the rows and to ascertain whether any dosimeter had been exposed to a potentially deleterious cumulative quantity of radiation. The exposure of personnel to radiation would thus be effectively monitored, both as to short term and as to cumulative dosages.

It is to be noted that the present method completely dispenses with a separate recharging of chamber 2 to the initial voltage $V_0$ since the very process of measurement recharges the chamber to the voltage $V_0$ of source 12. After measurement in the circuit of the drawing, chamber 2 is immediately ready for use again. Present practice in the art requires a separate recharging step.

It is intended to limit the present invention only by the scope of the appended claims.

What is claimed is:

1. A method for measuring an unknown integrated quantity of radiation with a condenser ionization chamber comprising the steps of initially charging said condenser ionization chamber to a predetermined voltage by a voltage source, removing said condenser ionization chamber from said voltage source, exposing said condenser ionization chamber to the unknown quantity of radiation for a period of time, whereby a portion of the charge on said condenser ionization chamber is neutralized, and simultaneously recharging said condenser ionization chamber to said predetermined voltage by said voltage source and measuring the magnitude of the pulse of recharging current.

2. A method for measuring an unknown integrated quantity of radiation with a condenser ionization chamber comprising the steps of initially charging said condenser ionization chamber to a predetermined voltage by a voltage source, removing said condenser ionization chamber from said voltage source, exposing said condenser ionization chamber to the unknown quantity of radiation for a period of time, whereby a portion of the charge on said condenser ionization chamber is neutralized, and simultaneously recharging said condenser ionization chamber to said predetermined voltage through an electrical impedance by said voltage source and measuring the voltage pulse developed across said electrical impedance by the recharging current.

References Cited in the file of this patent

UNITED STATES PATENTS

| | | |
|---|---|---|
| 1,933,063 | Kolhorster | Oct. 31, 1933 |
| 2,257,774 | Von Ardenne | Oct. 7, 1941 |
| 2,265,966 | Gebauer | Dec. 9, 1941 |
| 2,545,386 | Rich | Mar. 13, 1951 |
| 2,609,511 | Wright | Sept. 2, 1952 |
| 2,645,722 | Chaminade | July 14, 1953 |
| 2,682,583 | Shonka et al. | June 29, 1954 |